No. 701,929. Patented June 10, 1902.
F. C. PEABODY.
WRENCH.
(Application filed Mar. 17, 1902.)
(No Model.)
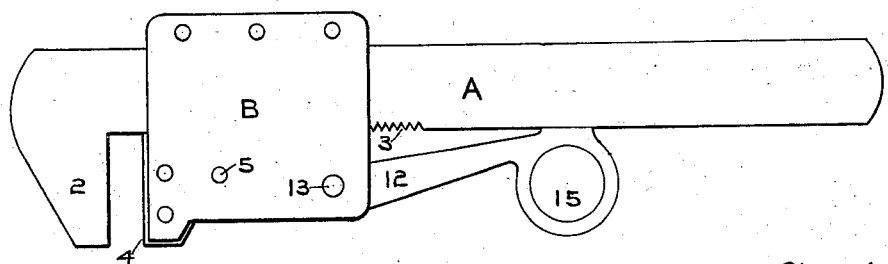
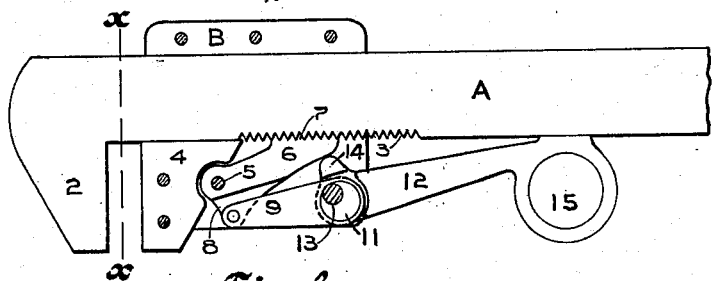
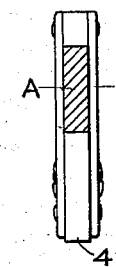
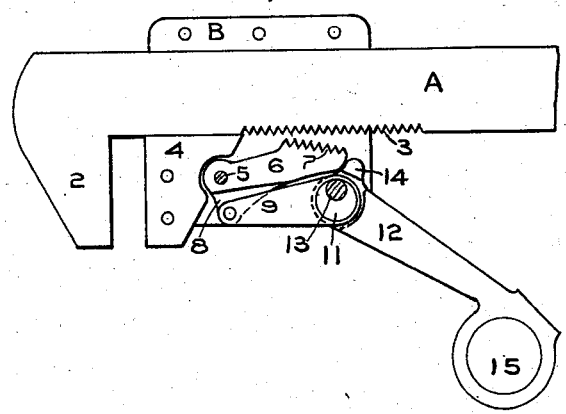
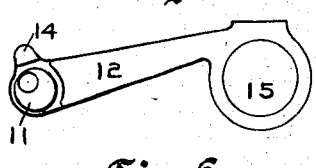
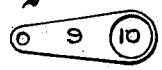
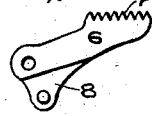
Witnesses,
W. H. Palmer
Emily Eastman
Inventor;
Francis C. Peabody.
by Lothrop & Johnson
his Attorneys.
THE NORRIS PETERS CO., PHOTO-LITHO., WASHINGTON, D. C.

UNITED STATES PATENT OFFICE.

FRANCIS C. PEABODY, OF ST. PAUL, MINNESOTA.

WRENCH.

SPECIFICATION forming part of Letters Patent No. 701,929, dated June 10, 1902.

Application filed March 17, 1902. Serial No. 98,508. (No model.)

*To all whom it may concern:*

Be it known that I, FRANCIS C. PEABODY, a citizen of the United States, residing at St. Paul, in the county of Ramsey and State of Minnesota, have invented certain new and useful Improvements in Wrenches, of which the following is a specification.

My invention relates to improvements in wrenches, its object being to provide improved actuating means for the movable jaw of the wrench.

To this end my invention consists in the features of construction and combination hereinafter particularly described and claimed.

In the accompanying drawings, forming part of this specification, Figure 1 is a side view of my improved wrench. Fig. 2 is a similar view with one side of the casing for the sliding jaw removed. Fig. 3 is a similar view with the actuating mechanism released. Fig. 4 is a section on line $x\,x$ of Fig. 2; and Figs. 5, 6, and 7 are details of a lever, link, and dog, respectively, constituting the coöperating parts of the actuating mechanism.

In the drawings, A represents the main bar of the wrench, formed with a downwardly-projecting jaw 2, and teeth 3 upon its inner side.

4 represents a slidable jaw supported intermediate of the casing-plates B. Having pivotal support 5 in the casing at the rear of the slidable jaw is a dog 6, provided with teeth 7, adapted to engage with the teeth 3. The pivoted end of the dog 6 is provided with a downwardly-projecting flange 8, to which is pivoted a link 9, the opposite end of the link being provided with an opening 10 to receive the eccentric 11 of the lever 12. The lever 12 has pivotal support 13 in the casing and is provided with an upwardly-projecting cam 14. The outer end of the lever 12 is preferably provided with a finger-opening 15.

In operation, the slidable jaw being moved to the desired position upon the wrench-bar and the lever 12 turned into the position shown in Fig. 2, the cam 14, carried by the lever 12, will press against the under side of the dog 6, holding said dog in engagement with the teeth of the wrench-bar. As the lever 12 is turned into the position shown in Fig. 3 the eccentric will carry the link forward, turning the dog downward and out of engagement with the teeth 3.

While I have shown my improvements applied to a monkey-wrench, I do not confine myself to such use and may employ the same in connection with any wrench having a movable jaw. I also do not restrict myself to the use of a single link 9, but may duplicate the same and otherwise modify the construction without departing from my invention, the scope of which is defined in the claims.

I claim—

1. In a wrench of the class described, the combination with a bar and fixed jaw, of a jaw slidable upon said bar, a supporting-casing for said slidable jaw, a dog pivoted in said casing, a lever, a link connection between said dog and lever, and a cam carried by said lever and adapted to be turned into engagement with said dog to hold the same in locking position.

2. In a wrench of the class described, the combination with a bar and jaw, of a slidable jaw carried by said bar, a dog pivotally supported in connection with said slidable jaw, a pivotally-supported lever, a link connection between said dog and lever, and a cam carried by said lever and adapted to be turned against said dog to actuate the same.

3. In a wrench of the class described, the combination with a bar and fixed jaw, of a slidable jaw supported by said bar, a dog pivotally supported in connection with said slidable jaw, a lever, an eccentric carried by said lever, a link connecting said eccentric and dog, and a cam carried by said lever, as and for the purpose set forth.

4. In a wrench of the class described, the combination with a bar and fixed jaw, of a slidable jaw, a supporting-casing carried by said bar, a dog pivotally supported in said casing, a similarly-supported lever, an eccentric carried by said lever, a link connecting said eccentric and dog, and a cam carried by the pivoted end of said lever, as and for the purpose set forth.

5. In a wrench of the class described, the combination with a bar and fixed jaw, of a jaw and casing slidably supported by said bar, a dog pivotally supported in said casing, a pivoted lever, an eccentric carried by the pivoted end of said lever, a link connecting said eccentric and the dog below its pivotal support, and a cam carried by the pivoted end of said lever and projecting toward said dog, as and for the purpose set forth.

In testimony whereof I affix my signature in presence of two witnesses.

FRANCIS C. PEABODY.

Witnesses:
 LLOYD PEABODY,
 H. S. JOHNSON.